(12) United States Patent
Wand

(10) Patent No.: US 6,870,345 B1
(45) Date of Patent: Mar. 22, 2005

(54) SERVO LOOP PID COMPENSATOR WITH EMBEDDED RATE LIMIT

(75) Inventor: Martin A. Wand, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 19 days.

(21) Appl. No.: 10/672,681

(22) Filed: Sep. 26, 2003

(51) Int. Cl.[7] .................. G05B 11/01; G05B 11/42; G05B 13/02

(52) U.S. Cl. .................. 318/610; 318/609; 318/560; 318/568.22; 700/42

(58) Field of Search ................ 318/600–611, 560, 318/561, 568.22, 615, 616, 632, 432; 700/41–43; 701/60

(56) References Cited

U.S. PATENT DOCUMENTS

| | | | | |
|---|---|---|---|---|
| 3,723,842 A | * | 3/1973 | Sather | 318/610 |
| 4,390,942 A | * | 6/1983 | de Keizer | 318/610 |
| 4,471,735 A | * | 9/1984 | Collonia | 361/236 |
| 5,134,354 A | * | 7/1992 | Yamamoto et al. | 318/609 |
| 5,184,055 A | * | 2/1993 | Ohishi et al. | 318/615 |
| 5,216,342 A | * | 6/1993 | Torii et al. | 318/609 |
| 5,272,423 A | * | 12/1993 | Kim | 318/609 |
| 5,303,142 A | * | 4/1994 | Parsons et al. | 700/40 |
| 5,692,487 A | * | 12/1997 | Schuerz et al. | 123/696 |
| 5,714,831 A | * | 2/1998 | Walker et al. | 310/316.01 |
| 5,764,017 A | * | 6/1998 | Bauck | 318/610 |
| 5,894,205 A | * | 4/1999 | Shimizu et al. | 318/432 |
| 6,285,115 B1 | * | 9/2001 | Gallmeyer et al. | 310/317 |
| 6,573,679 B1 | * | 6/2003 | Villaret | 318/610 |

* cited by examiner

*Primary Examiner*—David Martin
*Assistant Examiner*—Eduardo Colon Santana
(74) *Attorney, Agent, or Firm*—Robert D. Marshall, Jr.; W. James Brady, III; Frederick J. Telecky, Jr.

(57) ABSTRACT

This invention describes a reconfigured form of the PID compensator such that the rate of change of the position error is inherently limited without affecting the performance of the servo loop when the position error is small. The technique described here maintains the performance of the conventional PID compensator when the position error is close to zero, which is the operating point of primary interest.

12 Claims, 3 Drawing Sheets

SERVO LOOP PID COMPENSATOR WITH EMBEDDED RATE LIMIT

TECHNICAL FIELD OF THE INVENTION

The technical field of this invention is feedback control systems employing proportional, integral and differential compensation.

BACKGROUND OF THE INVENTION

Feedback control systems, also known as servomechanisms or servo devices have been developed using a wide variety of technologies and techniques. These systems have a broad spectrum of applications. Many special types of servos are used in high performance equipment. A special type of servo loop acting to achieve proportional, integral and differential (PID) compensation is often used to processes an error signal and generate a command. The goal of this loop is to generate the proper command to ultimately drive the error signal to zero. The command generated by the PID compensator consists of three components.

1. The component proportional to the error (proportional P).
2. The component proportional to the cumulative sum of the error (integral I).
3. The component proportional to the rate of change of the error (derivative D).

Consider the case where the error is a position error. The task of the PID compensator is to drive the servomechanism to a commanded position, thus reducing the position error to zero. The design of the proper PID compensator is well-known to practitioners in the field of control systems and the details of such design approaches are not the major focus of this invention. Conventional design techniques assure that the design is stable with appropriate stability margins. Digital servos are increasingly common because they are very effective due to development in recent years.

When a design is implemented considerations must be given to factors such as mechanical, electrical and timing limits. These limits may be exceeded if the mechanism moves too quickly. An example, is when the compensator generates a command to a very fast actuator and the loop must have a large bandwidth to hold the position in the presence of high frequency disturbances. Such devices work well when the position error is small and all techniques have been brought to bear to overcome these disturbances. Consider, what happens when a new position command is issued. The position error is very large resulting in an extremely large component of proportional correction signal. This results in a large correction command given to the actuator driver that tends to cause correction. The integral component also begins changing but its effect is not as immediate. The derivative component is an impulse because the rate of change of the position error is large. In a prior art design a high performance actuator can quickly reach high speeds.

FIG. 1 illustrates the components of a prior art PID compensator. The control equations are easily recognized in FIG. 1. The input signal is position error 100. The output signal is torque command 110. The proportional signal couples position error 100 to summing junction 103. The integrate signal comes from integration block 101 and the modifying gain constant factor $W_1$ in amplifier block 102. The signal operation comes from derivative block 105, the modifying gain constant factor $1/W_2$ in amplifier block 106, low pass filter 107 having a cutoff frequency of $W_3$ and low pass filter 108 having a cutoff frequency of $W_4$. The transfer function frequency characteristics are shaped at low frequencies through parameters $W_1$ and $W_2$ and by parameters $W_3$ and $W_4$ at high frequency.

There is need to introduce a moderating factor in the servo operation to prevent unwarranted over-drive of the high performance actuator. The PID compensator of FIG. 1 may be described mathematically by transfer function equation [1] which omits $W_3$ and $W_4$ for simplicity:

$$H_0(s) = 1 + \frac{w_1}{s} + \frac{s}{w_2} \quad [1]$$

FIG. 2 illustrates a piece-wise graphical representation of the PID compensator of FIG. 1 and Equation 1 with an arbitrary overall gain. The integral portion 200 removes low frequency offsets (DC bias) and the derivative portion 207 provides fast response to high frequency disturbances. The proportional portion 205 bridges the integral and derivative regions. FIG. 2 also illustrates the derivative poles, $W_3$ 203 and $W_4$ 204 for the typical PID compensator illustrated in FIG. 1. In FIG. 2, the lower frequency break points $W_1$ 201 and $W_2$ 202 of the transfer function versus frequency are introduced by the frequency responses of respective amplification stages 102 and 106. Since the differentiator is the dominant component at frequencies above $W_2$ 202, the poles $W_3$ 203 and $W_4$ can be included in the implementation without affecting the validity of the approaches to be described here.

SUMMARY OF THE INVENTION

This invention describes a reconfigured form of the well known proportional, integral, differential (PID) servo compensator. The reconfiguration provides inherent limits on the rate of change of the position error without affecting the performance of the servo loop when the position error is small. The technique maintains the high-performance of current PID servo compensators when the position error is close to zero, the operating point of primary interest.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
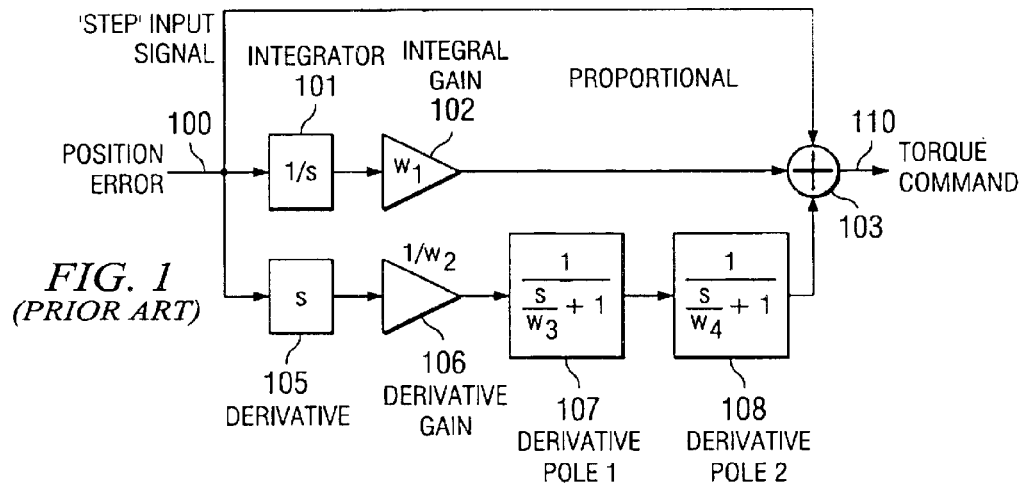
FIG. 1 illustrates a functional block diagram of a RID servo compensator of the prior art.
Figure 2:
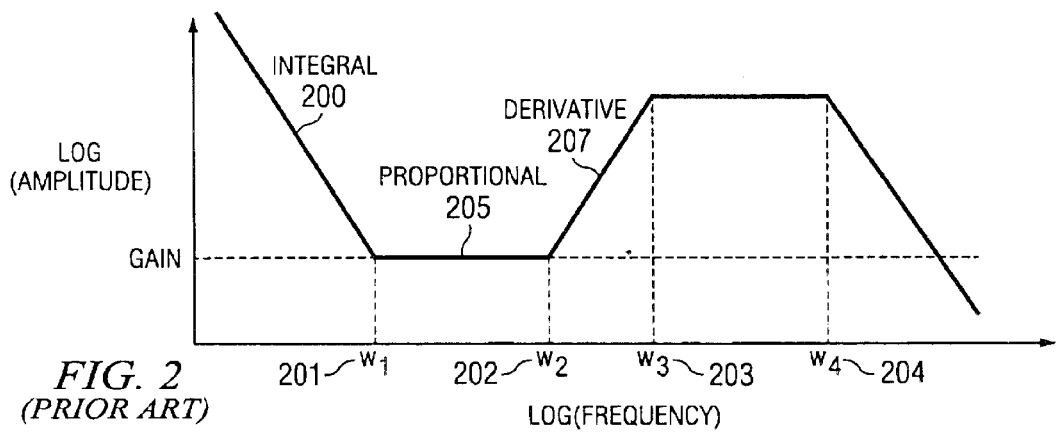
FIG. 2 illustrates the log gain versus frequency characteristic of the PID servo compensator illustrated in FIG. 1.
Figure 3:
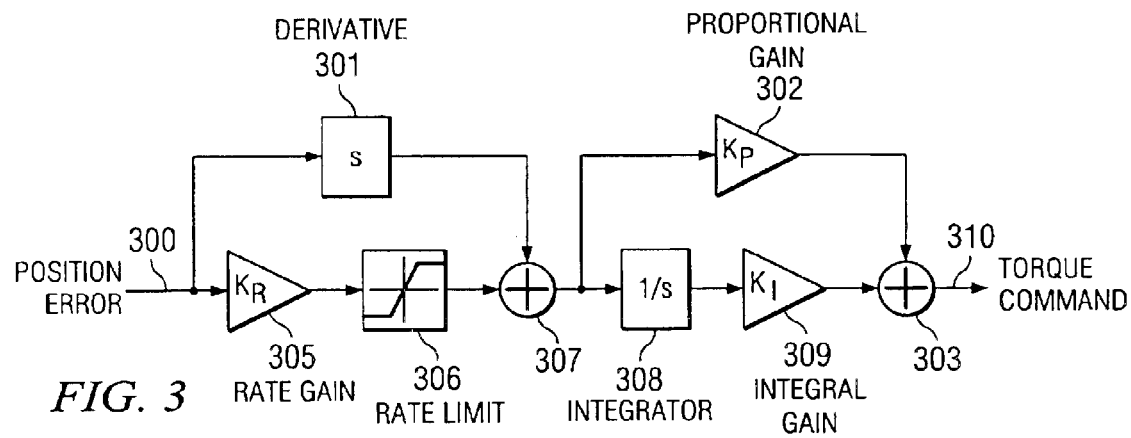
FIG. 3 illustrates the functional block diagram of a modified PID servo compensator with explicit rate limit of this invention.

This invention recognizes an important principle. An alternate form of PID servo compensator providing rate limiting is desirable. This invention permits computations of the rate command based on the position error so that the rate command could be limited. FIG. 3 illustrates one possible approach. Equation 2 below is the corresponding transfer function. The three forward paths of FIG. 1 are modified in FIG. 3 to form the four forward paths of FIG. 3. This gives the same functional features while including a rate limiting block 306. Derivative block 301 forms the derivative term. Gain block 302 controls the derivative gain. Similarly, gain block 305, integrator 308 and integral gain block 309 implement the integral term. The proportional factor is implemented through two paths in FIG. 3. These two paths use: derivative block-301, integrator 308, and integral block 309 for one path; and gain blocks 305 and 302 for the other path. These two paths-sum to equal the cumulative proportional effect. Summing junction 303 forms the torque command 310.

Employing the principle of superposition since these are linear networks, the overall transfer function can be derived by inspection in terms of the four forward paths. In operational mathematics notation, Equation 2 represents mathematically the transfer functional of the block diagram of FIG. 3. For simplicity and conciseness in describing the techniques of the invention, the differentiator poles, $W_3$ 203 and $W_4$ 204, are omitted at this point from FIG. 3 though these differentiator poles must be accounted for in the final implementation.

$$H_2(s) = \left( \left( K_R \times K_P + K_1 + \frac{(K_R \times K_1)}{s} + K_P \times s \right) \right) \quad [2]$$

The block diagram of FIG. 3 includes a computed rate command factor that can be limited and an integrator that can: be limited and reset to prevent windup.

Equating the coefficients of the PID terms in Equation 1 and Equation 2 yields three equations in three unknowns, illustrated in Equations 3.

$$K_R \times K_P + K_1 = 1 \quad [3]$$
$$K_R \times K_1 = w_1$$
$$K_P = \left(\frac{1}{w_2}\right)$$

Solving Equation 3 for $K_R$, $K_P$, and $K_I$ in terms of $W_1$ and $W_2$ can yield complex numbers. This form is thus not always realizable in hardware.

Figure 4:
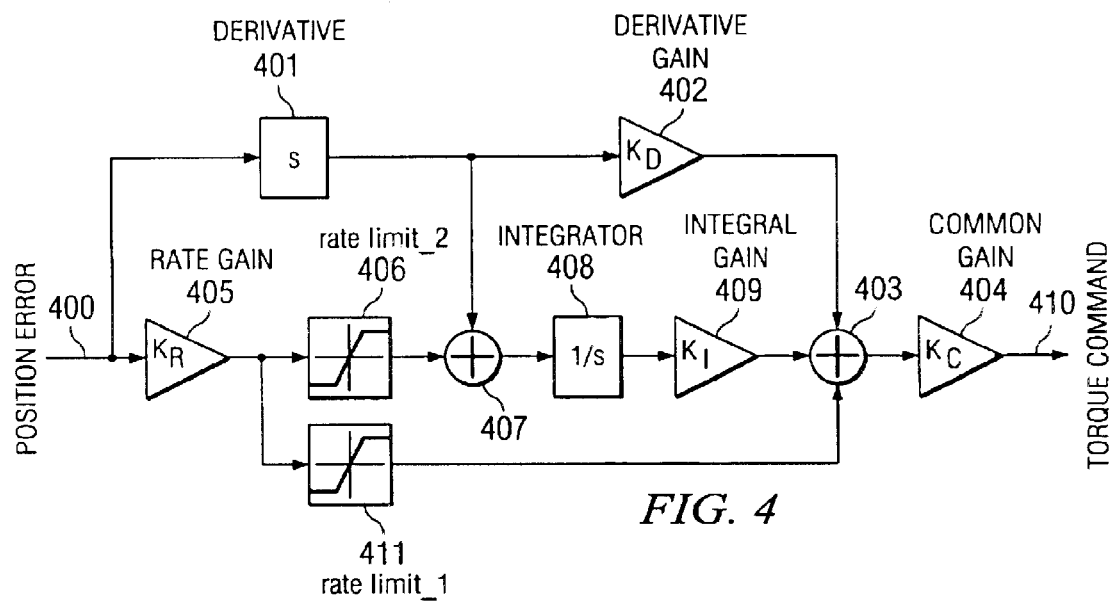
FIG. 4 illustrates the functional block diagram of the PID servo compensator of this invention with embedded rate limit.

Another path or paths must be added in the controller of FIG. 3 to insure it is realizable. FIG. 4 illustrates such an embodiment of the servo compensator. This is similar to the servo compensator of FIG. 3 with changes to the path for the computed rate and an additional proportional path with limit to the output. FIG. 4 also includes slight changes in the gain blocks. The gain after the last summing junction $K_C$ normalizes the compensator gain to match the gain of the original compensator of FIG. 3.

Equation 4 shows the transfer function for the compensator of FIG. 4. The limit blocks are ignored for now. The differentiator poles, $W_3$ 203 and $W_4$ 204, are omitted from FIG. 4 though these differentiator poles must be included in the final implementation.

$$K_C \times \left[ (K_1 + K_R) + \frac{K_R \times K_1}{s} + K_D \times s \right] \quad [4]$$

Equating the coefficients as before yields three equations with four unknowns:

$$K_C \times (K_I + K_R) = 1 \quad [5]$$
$$K_C \times K_R \times K_I = w_1$$
$$K_C \times K_D = \left(\frac{1}{w_2}\right)$$

Equations 5 have more than one solution because there are four unknowns. Solving for $K_I$ results in a quadratic.

$$K_1 = \frac{1 \pm \sqrt{1 - 4 \times K_C \times w_1}}{2 \times K_C} \quad [6]$$

The value of $K_C$ can be selected such that the quadratic term of Equation 6 is zero, guaranteeing a single real value for $K_I$. This becomes the fourth equation in the solution. The results of the four equations are shown in Equation 7. These coefficients yield the same closed loop results as the original form of Equation 1.

$$K_i = 2 \times w_1 \quad [7]$$
$$K_r = 2 \times w_1$$
$$K_d = \frac{(4 \times w_1)}{w_2}$$
$$K_c = \frac{1}{(4 \times w_1)}$$

Now the rate limit can be applied. Note that the commanded rate goes to two different limit blocks 406 and 411. When the position error is large and the measured rate equals the desired rate in steady state operation (constant slew rate), a constant output that counteracts friction or any torque offsets such as gravity or springs is desirable. Of course the output is not truly constant, since the spring torque may change as the actuator moves but that is why the loop is closed. This constant output should come from the integrator. By setting rate_limit_2 to the desired rate, the integrator input becomes zeros. Thus the integrator output is instantaneously constant. Setting rate_limit_1 equal to the desired rate times $K_P$, the other paths contribute nothing to the output in this particular steady state condition.

Figure 5:
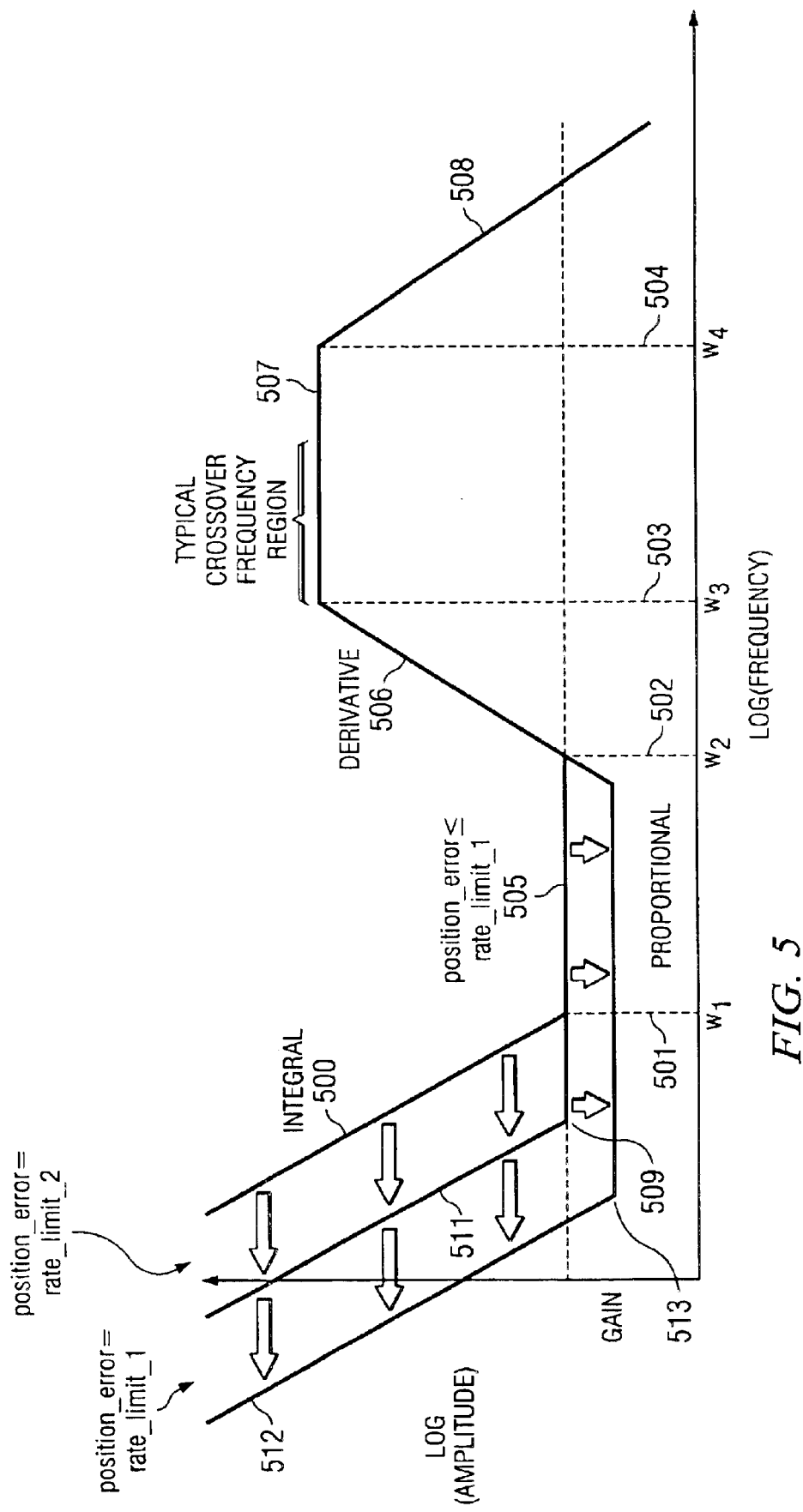
FIG. 5 illustrates the log gain versus frequency characteristic of the servo PID compensator with embedded rate limit of this invention.

What do the two limits do to the stability and performance of the servo loop? The condition where neither limit is reached is identical to the original design that was stable by design. When the position error is mid-range where the position error exceeds rate_limit_2 but not rate_limit_1, the limit has the same effect as reducing $K_R$ to $K_R'$ such that [$K_R$×position_error]=rate_limit_2. In Equation 5, this reduction of $K_R$ only affects the integral coefficient so that now $K_C \times K_R' \times K_I = W_1$. So reducing KR has the effect of reducing $W_1$. This reduces the effect of the integrator by reducing the frequency where the integrator ends. In the process, it reduces the gain of all frequencies up to the original $W_1$. FIG. 5 shows this graphically. Below rate_limit_2 the curve 500 is applicable. Above rate_limit_2 but below rate_limit_1, the curve 511 is applicable. Finally above rate_limit_1, the curve 512 is applicable.

Assuming that the crossover frequencies where the gain and phase margins are recorded are sufficiently higher than $W_1$, the reduction of $W_1$ has little effect on the stability of the controller. This is in fact the very type of servo that this invention is useful for, where the servo has a high bandwidth.

When the position error is large and exceeds both rate_limit_2 and rate_limit_1, the effect is similar to a reduction in $K_R$ for both paths. As before, refer to the reduced gain of the integral path as $K_R'$. Because rate_limit_1 equals rate_limit_2×$K_D$, the equivalent $K_R$ for that path is $K_R' \times K_D$.

Note from equation 5 that the derivative term is still not affected by the limits. Both the proportional and integral paths are affected. The frequency where the integral region ends continues to decrease and the gain of the proportional region decreases as the position error increases. FIG. 5 shows this graphically. In the region 506 the derivative term remain unaffected by rate limits. In the region 505 the proportional term gain is decreased with lower corner frequency also, reduced to 509 or 513, upon exceeding rate_limit_2 and rate_limit_1 respectively. In the region 500 the integral term remains on the original curve 500 for small error but shifts to, 511 when the position error exceeds rate_limit_2 and shift to curve 512 when the position error exceeds rate_limit_1.

FIG. 5 illustrates curves 500, 511 and 512 separately whereas they actually represent three distinct operating points. The integral portion of the response transitions smoothly from curve 500 to the left as the position error increases. For example, when position error equals rate_limit_2, curves 500 and 511 are identical.

As before, this has little effect on the higher frequencies so it has little effect on the stability of the controller. The exact effect of the limits on the stability of the servo can be analyzed if desired.

The two derivative low pass filters with respective cut off frequencies of $W_3$ and $W_4$ are provided in the derivative path following derivative block 401 in a manner similar to that illustrated in FIG. 1.

There are many ways to configure a PID compensator but no implementation that is the same as described in this invention. Other common ways to accomplish rate control or a position servo are listed below.

1. The position command can be ramped to the desired position as the actuator moves causing the rate to be controlled. The ramp rate of the position command will determine the achieved rate. This is not always straightforward, since in some servo systems, the position command does not explicitly exist. Only the position error may be available, as is often the case when all positioning is relative instead of absolute.
2. The position error can be limited prior to the PID compensator. The problem with this type of implementation is that the derivative term is effectively removed from the compensator while the position error exceeds the limit because the position error into the PID compensator remains constant until it is less than the limit. There is no apparent motion. Also, the integral term must be limited because it will windup during the entire move.
3. A separate rate loop can be designed to handle the move then the controller can switch to the PID compensator as the position error approaches zero. This requires design of two separate loops and care must be exercised during the switchover to prevent glitches in the command. Such a rate loop also needs some sort of profile control to slow down the actuator prior to the switchover. This method might be preferable over the method described in this disclosure when very precise control of the rate is required.

ADVANTAGES OF THE INVENTION

1. Maintains the stability performance of the traditional PID compensator design.
2. Controls the rate of the servo while maintaining the effect of a PID compensator during the entire move.
3. Does not require the design of multiple compensators for different operating modes.
4. If one considers the two limits within the loop as representing different operating modes, the switch between modes is automatic, inherently glitch-free and no special considerations are required to handle the transitions.
5. This technique can be applied in both digital and analog implementations since it is not a multi-mode controller requiring sophisticated mode control.

This invention is usable in any servo that meets the criteria of high bandwidth, fast actuator and required rate limit during moves.

What is claimed is:

1. A servomechanism having proportional, integral, and differential control (PID) receiving an error signal and generating a command signal comprising:

a first gain block having an input receiving the error signal, an output and a first gain;

a first rate-limiter block having an input connected to said output of said first gain block, an output and a first rate limit;

a derivative block having an input receiving the error signal and an output;

a first summer-block having a first input connected to said output of said first rate-limiter block and a second input connected to said output of said derivative block and a first sum output;

a second rate-limiter block having an input connected to said output of said first gain block, and output and a second rate limit less than said first rate limit;

an integrator block having an input connected to said first sum output of said first summer-block and an output;

a second gain block having an input connected to said output of said integrator block, an output and a second gain;

a third gain block having an input connected to said output of said derivative block, an output and a third gain; and second summer-block having a first input connected to said output of said second gain block, a second input connected to said output of said third gain block, a third input connected to staid output of said second rate-limiter block, and a second sum output, said second sum output being said command signal.

2. The servomechanism of claim 1 further including:

a fourth gain block having an input connected to said second sum output of said second summer-block, an output being said command signal and a fourth gain.

3. The servomechanism of claim 1 further including:

at least one low-pass filter connected between said output of said derivative block and said input of said first summer-block and said input of said third gain block.

4. The servomechanism of claim 3 wherein:

said at least one low-pass filter includes
a first low-pass filter having an input connected to said output of said derivative block, an output and s first cutoff frequency, and
a second low-pass filter block having an input connected to said output of said first low-pass filter, and output and a second cutoff frequency higher than said first cutoff frequency.

5. The servomechanism of claim 4 wherein:
said first cutoff frequency and said second cutoff frequency are both higher than an effective cutoff frequency of said integrator block and an effective cutoff frequency of said derivative block.

6. The servomechanism of claim 5 wherein:
said first gain $K_R$, said second gain $K_I$, said third gain $K_D$ and said fourth gain $K_C$ are set whereby $$K_i = 2 \times w_1$$

$$K_r = 2 \times w_1$$

$$K_d = \frac{(4 \times w_1)}{w_2}$$

$$K_c = \frac{1}{(4 \times w_1)}$$

where $W_1$ is said effective cutoff frequency of said integrator block and $W_2$ is said effective cutoff frequency of said derivative block.

7. A method of servo control receiving an error signal and generating a command signal comprising the steps of:
amplifying the error signal by a first gain;
limiting the amplified error signal by a first rate limit;
forming a derivative of the error signal;
summing the a first rate limited amplified error signal and the derivative of the error signal thereby forming a first sum signal;
limiting the amplified error signal by block second rate limit, the second rate limit less than the first rate limit;
integrating block the first sum signal;
amplifying the derivative of the error signal by a second gain;
amplifying the integrated first sum signal by a third gain; and
summing amplified first sum signal, the amplified derivative signal and the second rate limited error signal thereby forming a second sum signal being said command signal.

8. The method of claim 7 further including:
amplifying the second sum signal by a fourth gain.

9. The method of claim 7 further including:
low-pass filtering the derivative signal.

10. The method of claim 9 wherein:
said step of low-pass filtering the derivative signal includes
a first low-pass filtering having a first cutoff frequency, and
a second low-pass filtering having a second cutoffs frequency higher than said first cutoff frequency.

11. The method of claim 10 wherein:
said first cutoff frequency and said second cutoff frequency are both higher than an effective cutoff frequency of said integrator block and an effective cutoff frequency of said derivative block.

12. The method of claim 11 wherein:
said first gain $K_R$, said second gain $K_I$, said third gain $K_D$ and said fourth gain $K_C$ are set whereby $$K_i = 2 \times w_1$$

$$K_r = 2 \times w_1$$

$$K_d = \frac{(4 \times w_1)}{w_2}$$

$$K_c = \frac{1}{(4 \times w_1)}$$

where $W_1$ is said effective cutoff frequency of said integrator block and $W_2$ is said effective cutoff frequency of said derivative block.

* * * * *